(12) United States Patent
Kawahara et al.

(10) Patent No.: US 11,476,482 B2
(45) Date of Patent: Oct. 18, 2022

(54) FUEL CELL SYSTEM

(71) Applicant: TOYOTA JIDOSHA KABUSHIKI KAISHA, Toyota (JP)

(72) Inventors: Shuya Kawahara, Toyota (JP); Hiroyuki Imanishi, Toyota (JP); Takeho Aisaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/226,417

(22) Filed: Apr. 9, 2021

(65) Prior Publication Data

US 2021/0376356 A1 Dec. 2, 2021

(30) Foreign Application Priority Data

May 27, 2020 (JP) ............................. JP2020-092626

(51) Int. Cl.
*H01M 8/04* (2016.01)
*H01M 8/04746* (2016.01)
*H01M 8/04111* (2016.01)

(52) U.S. Cl.
CPC .... *H01M 8/04776* (2013.01); *H01M 8/04111* (2013.01); *H01M 8/04753* (2013.01)

(58) Field of Classification Search
CPC ......... H01M 8/04776; H01M 8/04111; H01M 8/04753
See application file for complete search history.

(56) References Cited

U.S. PATENT DOCUMENTS

| | | | |
|---|---|---|---|
| 2010/0291446 A1* | 11/2010 | Aso | H01M 8/04626 429/429 |
| 2019/0088962 A1* | 3/2019 | Chikugo | F01K 23/02 |
| 2019/0267645 A1 | 8/2019 | Namba et al. | |

FOREIGN PATENT DOCUMENTS

| | | |
|---|---|---|
| JP | 2013054842 A | 3/2013 |
| JP | 2019145433 A | 8/2019 |

* cited by examiner

*Primary Examiner* — Olatunji A Godo
(74) *Attorney, Agent, or Firm* — Dickinson Wright, PLLC

(57) ABSTRACT

Provided is a fuel cell system capable of suppressing the movement of an operating point of a compressor between a surge region and a non-surge region to reduce operation sounds and vibrations, the fuel cell system including at least: a fuel cell; a compressor; a dry state estimation part to estimate a dry state of the fuel cell; and a pressure target control part to control a pressure target, wherein the pressure target control part is capable of executing at least rise control and lower control, the rise control and the lower control being such that an operating point of the compressor is positioned outside a surge region, a current pressure target is corrected to the value same as a last pressure target if the current pressure target is lower (higher) than the last pressure target when the rise control (lower control) is being carried out.

6 Claims, 8 Drawing Sheets

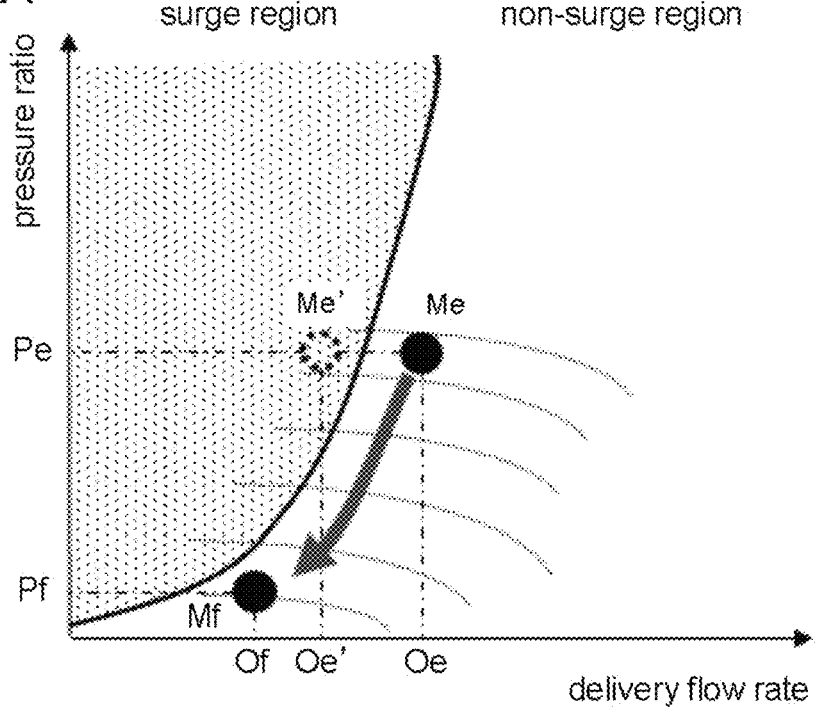
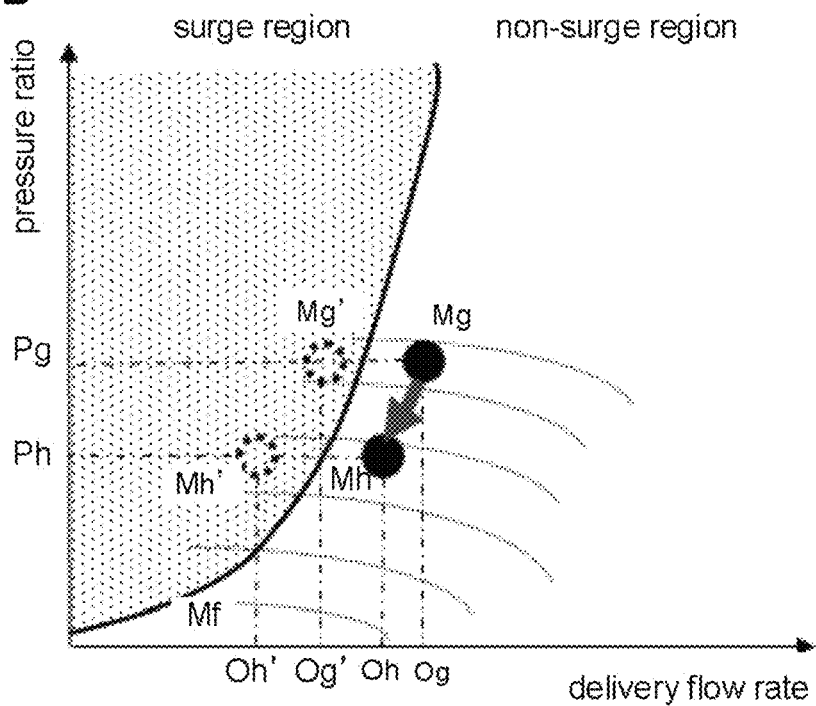

FUEL CELL SYSTEM

FIELD

The present application relates to a fuel cell system.

BACKGROUND

Fuel cell vehicles that are environmental-friendly low emission vehicles have been put to practical use in recent years. The fuel cell vehicle is equipped with a fuel cell system for supplying a fuel gas and an oxidant gas to generate electricity. In such a fuel cell system, an oxidant gas is supplied to a fuel cell by means of a compressor.

Patent Literature 1 describes a fuel cell system for operating a turbo compressor in response to a request from the fuel cell system, and for executing temperature and pressure lowering control to lower the delivery pressure of the compressor such that an operating point after lowering is positioned outside a surging region when the operating point is positioned within the surging region, the operating point after lowering being an operating point determined with the delivery flow rate of the compressor and a pressure ratio after a measured atmospheric pressure becomes lower than a reference atmospheric pressure.

Patent Literature 2 describes a fuel cell system for estimating the amount of water in a fuel cell when the temperature of the fuel cell is raised to a warm-up completion temperature, and performing drying operation based on the estimated amount of water.

CITATION LIST

Patent Literature

Patent Literature 1: JP 2019-145433 A
Patent Literature 2: JP 2013-54842 A

SUMMARY

Technical Problem

In a fuel cell system, a compressor is operated to supply an oxidant gas to a fuel cell. The compressor may surge according to operation conditions (for example, in an idle operation). Specifically, surging occurs when an operating point determined by the delivery flow rate and the pressure ratio of the compressor is positioned in a surge region. It is necessary to change control of the compressor so that the operating point is moved from the surge region to a non-surge region in order for surging not to occur since surging makes it impossible for the compressor to properly operate. The movement of the operating point of the compressor between the surge region and the non-surge region as described above makes it necessary to change control of the compressor according thereto, and operation sounds and vibrations from the change may feel uncomfortable for drivers. Therefore, to reduce such sounds and vibrations as much as possible brings about the improvement in customer satisfaction.

With the foregoing actual circumstances in view, an object of the present application is to provide a fuel cell system capable of suppressing the movement of an operating point of a compressor between a surge region and a non-surge region to reduce operation sounds and vibrations.

Solution to Problem

As a first embodiment for solving the foregoing problem, the present application discloses a fuel cell system comprising: a fuel cell; a compressor to supply an oxidant gas to the fuel cell based on a pressure target; a dry state estimation part to estimate a dry state of the fuel cell; and a pressure target control part to control the pressure target of the oxidant gas according to a result estimated in the dry state estimation part, wherein the pressure target control part is capable of executing at least rise control to raise the pressure target, and lower control to lower the pressure target, the rise control and the lower control are such that an operating point determined by a delivery flow rate and a pressure ratio of the compressor is positioned outside a surge region, a current pressure target is corrected to a value same as a last pressure target if the current pressure target is lower than the last pressure target when the rise control is being carried out, and the current pressure target is corrected to the value same as the last pressure target if the current pressure target is higher than the last pressure target when the lower control is being carried out.

As a second embodiment for solving the foregoing problem, the present application discloses a fuel cell system comprising: a fuel cell; a compressor to supply an oxidant gas to the fuel cell based on a pressure target; a dry state estimation part to estimate a dry state of the fuel cell; a freeze protection control part to execute freeze protection control such that a temperature of the fuel cell is raised for suppressing a freeze of the fuel cell; and a dry protection control part to execute dry protection control such that dryness of the fuel cell is suppressed based on a result estimated in the dry state estimation part, wherein the dry protection control part controls a pressure ratio of the compressor so that an operating point determined by a delivery flow rate of the compressor and the pressure ratio is positioned outside a surge region when the freeze protection control and the dry protection control are executed at the same time.

In the first or second embodiment, the compressor may be a turbo compressor.

Advantageous Effects

The fuel cell system according to the present disclosure is capable of suppressing the movement of the operating point of the compressor between the surge region and the non-surge region to reduce operation sounds and vibrations from the movement between the surge region and the non-surge region.

BRIEF DESCRIPTION OF DRAWINGS

FIG. 2A explanatorily shows one example of a conventional required pressure path and required pressure paths of the fuel cell system 100; and FIG. 2B explanatorily shows the paths when the required current values change in the middle of the paths;

FIG. 3A shows one example of the fluctuation of an operating point of a conventional compressor; and FIG. 3B shows one example of the fluctuation of an operating point of a compressor 21b of the fuel cell system 100;

FIGS. 4A and 4b are graphs showing the relationship between delivery flow rates and pressure ratios of compressors in lower control: FIG. 4A shows one example of the fluctuation of an operating point of a conventional compressor; and FIG. 4B shows one example of the fluctuation of the operating point of the compressor 21b of the fuel cell system 100;

FIG. 7A shows one example of the fluctuation of an operating point of a conventional compressor; and FIG. 7B shows one example of the fluctuation of the operating point of the compressor 21b of the fuel cell system 200.

DESCRIPTION OF EMBODIMENTS

First Embodiment

The first embodiment of the fuel cell system according to the present disclosure will be described. The first embodiment in the present disclosure is a fuel cell system comprising: a fuel cell; a compressor to supply an oxidant gas to the fuel cell based on a pressure target; a dry state estimation part to estimate a dry state of the fuel cell; and a pressure target control part to control the pressure target of the oxidant gas according to a result estimated in the dry state estimation part, wherein the pressure target control part is capable of executing at least rise control to raise the pressure target, and lower control to lower the pressure target, the rise control and the lower control are such that an operating point determined by the delivery flow rate and the pressure ratio of the compressor is positioned outside a surge region, a current pressure target is corrected to the value same as a last pressure target if the current pressure target is lower than the last pressure target when the rise control is being carried out, and the current pressure target is corrected to the value same as the last pressure target if the current pressure target is higher than the last pressure target when the lower control is being carried out.

Figure 1:
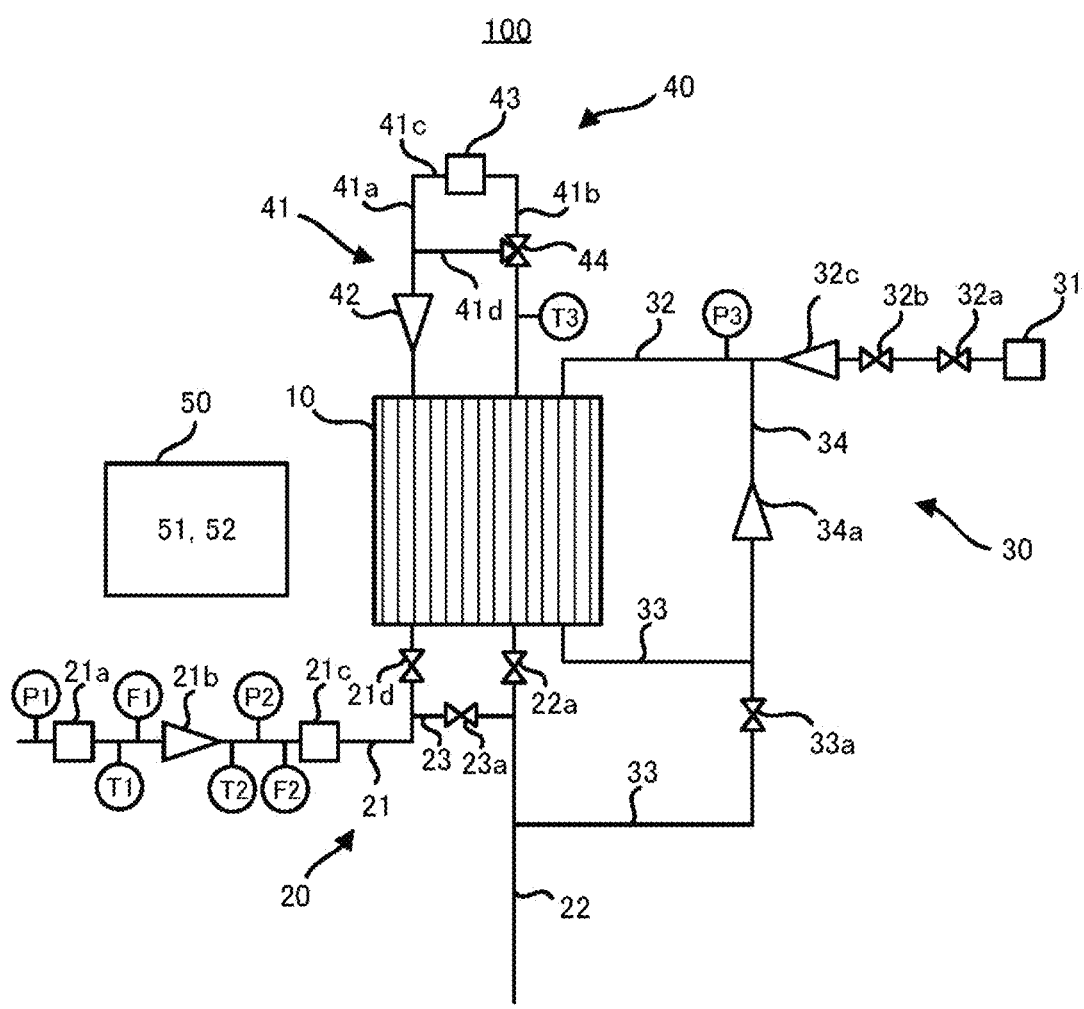
FIG. 1 is a block diagram of a fuel cell system 100.

Hereinafter description will be given using a fuel cell system 100 that is one example of the first embodiment. FIG. 1 shows a block diagram of the fuel cell system 100.

As in FIG. 1, the fuel cell system 100 includes at least a fuel cell 10, an oxidant gas supply and removal part 20, a fuel gas supply and removal part 30, a refrigerant circulation part 40 and a control part 50. In addition to the foregoing, the fuel cell system 100 may include any members that are generally included in a fuel cell system.

<Fuel Cell 10>

A function of the fuel cell 10 is to generate electricity in response to the supply of an oxidant gas and a fuel gas. Any known fuel cell that can be used for the fuel cell system 100 can be used as the fuel cell 10 without particular limitations. Examples of such a fuel cell include polymer electrolyte fuel cells. The fuel cell 10 may have a stacked structure formed of a plurality of stacked single cells. Here, the face of the fuel cell 10 where the oxidant gas supply and removal part 20 is connected may be referred to as a cathode, and the face thereof where the fuel gas supply and removal part 30 is connected may be referred to as an anode. The oxidant gas supplied to the fuel cell 10 is consumed on the cathode by the fuel cell reaction. The oxidant gas in a wet state because of water generated by this reaction is removed from the fuel cell 10. The wet oxidant gas removed from the fuel cell 10 is referred to as an oxidant off-gas. Likewise, the fuel gas supplied to the fuel cell 10 is consumed on the anode by the fuel cell reaction. The fuel gas in a wet state because of water generated by this reaction is removed from the fuel cell 10. The wet fuel gas removed from the fuel cell 10 is referred to as a fuel off-gas. Here, examples of the fuel gas include hydrogen gas, and examples of the oxidant gas include air.

<Oxidant Gas Supply and Removal Part 20>

The oxidant gas supply and removal part 20 has an oxidant gas supply function to supply the oxidant gas to the fuel cell 10, an oxidant gas removal function to remove the oxidant gas that is removed from the fuel cell 10 (which is also referred to as "oxidant off-gas") to the outside, and a bypass function to remove the oxidant gas to the outside without any intervention of the fuel cell 10.

The oxidant gas supply and removal part 20 includes an oxidant gas supply flow path 21 that is a pipe for the oxidant gas to be supplied to the cathode flowing therein, an oxidant gas removal flow path 22 that is a pipe for removing the oxidant gas that is discharged from the cathode to the outside of the system, and a bypass flow path 23 that is a pipe connecting the oxidant gas supply flow path 21 and the oxidant gas removal flow path 22. Other than the foregoing, the oxidant gas supply and removal part 20 may include any members that are generally included in an oxidant gas supply and removal part.

The oxidant gas supply flow path 21 is a pipe for the oxidant gas to be supplied to the cathode flowing therein, and includes an air cleaner 21a, a compressor 21b, an intercooler 21c and an inlet valve 21d. The air cleaner 21a is to remove extraneous materials in the oxidant gas, which is to be supplied to the fuel cell 10. The compressor 21b is disposed on the downstream side of the air cleaner 21a, and is to supply the oxidant gas to the fuel cell 10 based on a pressure target determined in the control part 50 (pressure target control part 52). The compressor 21b absorbs the oxidant gas from the air cleaner 21a side (absorption side thereof), applies pressure using the rotation of an impeller disposed inside the compressor 21b, and supplies the compressed oxidant gas to the fuel cell 10 side. Here, the compressor 21b is preferably a centrifugal turbo compressor. Using a turbo compressor makes it easier to avoid the operating point of the compressor in a surge region. The intercooler 21c is disposed on the downstream side of the compressor 21b, and cools the oxidant gas, which is compressed by the compressor 21b and thus has a high temperature. The inlet valve 21d is a motor-operated valve for adjusting the flow resistance of the oxidant gas supply flow path 21, and is arranged on the downstream side of a portion where the bypass flow path 23 is connected. In the fuel cell system 100, the opening degree of the inlet valve 21d is set in 100% when the compressor 21b drives and the fuel cell 10 generates electricity, and is set in 0% when the compressor 21b stops and the fuel cell 10 stops generating electricity.

The oxidant gas supply flow path 21 includes an atmospheric pressure sensor P1, an outside temperature sensor T1, an absorption side air flow meter F1, a supply gas temperature sensor T2, a delivery side pressure sensor P2, and a delivery side air flow meter F2 as various sensors. The atmospheric pressure sensor P1 is to measure atmospheric pressure, and is arranged on the upstream side of the air cleaner 21a. The outside temperature sensor T1 is to measure the temperature of the oxidant gas to be taken into the compressor 21b, and is arranged on the upstream side of the compressor 21b. The absorption side air flow meter F1 is to measure the flow rate of the oxidant gas to be absorbed in the compressor 21*b*, and is arranged on the upstream side of the compressor 21*b*. The supply gas temperature sensor T2 is to measure the temperature of the oxidant gas delivered from the compressor 21*b*, and is arranged on the downstream side of the compressor 21*b*. The delivery side pressure sensor P2 is to measure the pressure of the oxidant gas delivered from the compressor 21*b*, and is arranged on the downstream side of the compressor 21*b*. Here, the value measured with the delivery side pressure sensor P2 can be regarded as the pressure in the cathode since being almost the same as the pressure in the cathode of the fuel cell 10. The delivery side air flow meter F2 is to measure the delivery flow rate of the oxidant gas delivered from the compressor 21*b*, and is arranged on the downstream side of the compressor 21*b*. The values measured by the various sensors are transmitted to the control part 50.

Here, the positions where the atmospheric pressure sensor P1 and the outside temperature sensor T1 are arranged are not limited to the foregoing. The atmospheric pressure sensor P1 and the outside temperature sensor T1 may be arranged at positions different from the foregoing as long as atmospheric pressure and the outside temperature can be measured. The delivery side pressure sensor P2 and the delivery side air flow meter F2 are not always included. The delivery side pressure and the delivery flow rate may be estimated from the rotation speed of the compressor 21*b* and the opening degree of each valve.

The oxidant gas removal flow path 22 is a pipe for removing the oxidant off-gas via the cathode of the fuel cell 10, and includes a pressure regulating valve 22*a* on the upstream side of a portion where the bypass flow path 23 is connected. The pressure regulating valve 22*a* is a motor-operated valve, and is capable of changing the opening degree thereof according to a command from the control part 50. The change of the opening degree of the pressure regulating valve 22*a* leads to the change of the flow resistance of the oxidant gas removal flow path 22, and regulated back pressures in the flow paths on the cathode side of the fuel cell 10.

The bypass flow path 23 is a pipe such that one end thereof is connected to a portion of the oxidant gas supply flow path 21 which is between the intercooler 21*c* and the inlet valve 21*d*, and the other end thereof is connected to the oxidant gas removal flow path 22 on the downstream side of the pressure regulating valve 22*a*. The bypass flow path 23 is a flow path for removing the oxidant gas that is delivered from the compressor 21*b* to the outside without any intervention of the fuel cell 10. The bypass flow path 23 includes a flow divider valve 23*a*. The flow divider valve 23*a* is a motor-operated valve, and is capable of changing the opening degree thereof according to a command from the control part 50. The change of the opening degree of the flow divider valve 23*a* leads to the change of the flow resistance of the bypass flow path 23, and the adjustment of the flow rate of air flowing from the oxidant gas supply flow path 21 to the bypass flow path 23.

<Fuel Gas Supply and Removal Part 30>

The fuel gas supply and removal part 30 has a fuel gas supply function to supply the fuel gas to the fuel cell 10, a fuel gas removal function to remove the fuel gas that is removed via the anode of the fuel cell 10 (which is also referred to as "fuel off-gas") to the outside, and a fuel gas circulation function to circulate the fuel gas through the fuel cell system 100.

The fuel gas supply and removal part 30 includes a fuel gas supply source 31, a fuel gas supply flow path 32 that is a pipe for the fuel gas to be supplied to the anode flowing therein, a fuel gas removal flow path 33 that is a pipe for the fuel gas removed via the anode flowing therein, and a circulation flow path 34 that is a pipe connecting the fuel gas supply flow path 32 and the fuel gas removal flow path 33. Other than the foregoing, the fuel gas supply and removal part 30 may include any members that are generally included in a fuel gas supply and removal part.

For example, the fuel gas supply source 31 is formed of a high pressure hydrogen tank, a hydrogen storage alloy, etc. For example, a 35 MPa or a 70 MPa hydrogen gas is stored in the fuel gas supply source 31. Opening an on-off valve 32*a* lets hydrogen gas flow out from the fuel gas supply source 31 to the fuel gas supply flow path 32. The fuel gas supply source 31 may be formed of a reformer that generates a hydrogen-rich reformed gas from hydrocarbon fuels, and a high pressure tank that brings the reformed gas generated by this reformer to a high pressure condition and maintains this condition therein.

The fuel gas supply flow path 32 is a pipe such that one end thereof is connected to the fuel gas supply source 31 and the other end thereof is connected to the fuel cell 10, and is a flow path for the fuel gas to be supplied to the anode flowing therein. The fuel gas supply flow path 32 includes the on-off valve 32*a*, a pressure reducing valve 32*b*, an injector 32*c* and a fuel gas pressure sensor P3. The on-off valve 32*a* is disposed on the outlet side of the fuel gas supply source 31, opens and closes the fuel gas supply flow path 32 according to a command from the control part 50, and lets the fuel gas flow from the fuel gas supply source 31 to the fuel gas supply flow path 32. The pressure reducing valve 32*b* is disposed on the downstream side of the on-off valve 32*a*. The opening degree of the pressure reducing valve 32*b* is controlled according to a command from the control part 50, which leads to a regulated pressure of the fuel gas in the fuel gas supply flow path 32. The injector 32*c* is an electromagnetically-driven on-off valve that is disposed on the downstream side of the pressure reducing valve 32*b*. The opening degree of the injector 32*c* is controlled according to a command from the control part 50, which leads to the supply of the fuel gas to the fuel cell 10. The fuel gas pressure sensor P3 measures the pressure on the downstream side of a portion where the circulation flow path 34, which will be described later, is connected. The value of the measured pressure is transmitted to the control part 50.

The fuel gas removal flow path 33 is a pipe such that one end thereof is connected to the fuel cell 10 and the other end thereof is connected to the oxidant gas removal flow path 22, and is a flow path for the fuel off-gas removed via the anode flowing therein. The fuel off-gas is removed to the outside of the system via the oxidant gas removal flow path 22. The fuel gas removal flow path 33 includes an air removal valve 33*a* to open and close the fuel gas removal flow path 33 according to a command from the control part 50. The control part 50 usually sets the air removal valve 33*a* in a closed state, and switches the air removal valve 33*a* to an opened state at a predetermined air removal timing, or at a removal timing of an inert gas in a fuel exhaust gas.

The circulation flow path 34 is a pipe connecting the fuel gas supply flow path 32 and the fuel gas removal flow path 33, and is a flow path for returning the fuel off-gas removed from the fuel cell 10 to the fuel gas supply flow path 32 again as a fuel gas. A gas-liquid separator capable of separating gas components and liquid water components may be arranged at a portion where the fuel gas removal flow path 33 and the circulation flow path 34 are connected since the fuel off-gas is in a wet state. One end of the circulation flow path 34 is connected to a portion of the fuel gas supply flow path 32 which is between the pressure reducing valve 32b and the fuel gas pressure sensor P3, and the other end thereof is connected to the fuel gas removal flow path 33 on the upstream side of the air removal valve 33a. The circulation flow path 34 includes a circulating pump 34a. The operation of the circulating pump 34a is controlled according to a command from the control part 50. The operation of the circulating pump 34a causes the fuel gas in the circulation flow path 34 to be fed to the fuel gas supply flow path 32.

<Refrigerant Circulation Part 40>

A function of the refrigerant circulation part 40 is to adjust the temperature of the fuel cell 10. The refrigerant circulation part 40 includes a refrigerant circulation flow path 41, a water pump 42, a radiator 43, a three-way valve 44 and a refrigerant temperature sensor T3. For example, water is used in the refrigerant circulation part 40 as a refrigerant. The refrigerant circulation flow path 41 includes a refrigerant supply flow path 41a, a refrigerant removal flow path 41b, a radiator flow path 41c and a refrigerant bypass flow path 41d.

The refrigerant supply flow path 41a is a pipe for supplying a refrigerant to the fuel cell 10. The water pump 42 is included in the refrigerant supply flow path 41a. The refrigerant in the refrigerant supply flow path 41a is pumped to the fuel cell 10 using the water pump 42 in response to a command from the control part 50. The refrigerant removal flow path 41b is a pipe for removing the refrigerant from the fuel cell 10. The refrigerant temperature sensor T3 is disposed at the refrigerant removal flow path 41b, which is on the outlet side of the fuel cell 10, and measures the temperature of the refrigerant removed from the fuel cell 10. The value measured with the refrigerant temperature sensor T3 is transmitted to the control part 50. Here, the temperature measured with the refrigerant temperature sensor T3 can be regarded as the temperature of the fuel cell 10 in the fuel cell system 100 since being almost the same as the temperature inside the fuel cell 10. When the refrigerant temperature sensor T3 is not used, the refrigerant temperature (fuel cell temperature) may be estimated from the operation history of fuel cell 10.

The radiator flow path 41c is a pipe connecting the refrigerant supply flow path 41a and the refrigerant removal flow path 41b. The radiator 43 is arranged at the radiator flow path 41c. A radiator fan is provided with the radiator 43. The radiator fan is to blow air to the radiator 43 in response to a command from the control part 50 to control the degree of heat radiation from the radiator 43.

The refrigerant bypass flow path 41d is a pipe for circulating the refrigerant in the refrigerant removal flow path 41b through the refrigerant supply flow path 41a without any intervention of the radiator 43. The three-way valve 44 is arranged at a connection portion of the refrigerant bypass flow path 41d and the refrigerant removal flow path 41b. The three-way valve 44 is to adjust the flow rate of the refrigerant circulating from the refrigerant removal flow path 41b to the radiator flow path 41c and the flow rate of the refrigerant circulating from the refrigerant removal flow path 41b to the refrigerant bypass flow path 41d in response to a command from the control part 50.

<Control Part 50>

The control part 50 is to control the whole of the fuel cell system 100, and to control the oxidant gas supply and removal part 20, the fuel gas supply and removal part 30, the refrigerant circulation part 40, etc. in response to requests to make the fuel cell 10 generate electricity. For example, the control part 50 is a computer configured by CPU, ROM, RAM, etc. The control part 50 executes software corresponding to various kinds of control to control the whole of the fuel cell system 100.

Here, the control part 50 includes at least a dry state estimation part 51 to estimate a dry state of the fuel cell 10, and the pressure target control part 52 to control the pressure target of the oxidant gas according to the result estimated in the dry state estimation part 51.

The dry state estimation part 51 is to estimate the dry state of the fuel cell 10 based on various parameters: for example, the dry state of the fuel cell 10 (the amount of water in the fuel cell) is estimated based on any of the power generation current, the temperature and the stack impedance of the fuel cell 10, or any combination thereof.

The pressure target control part 52 is to control the pressure target of the oxidant gas according to the result estimated in the dry state estimation part 51. The pressure target is a target value of the pressure of the oxidant gas in the cathode of the fuel cell 10.

The requests from the fuel cell system include a request for suppressing dryness of the fuel cell. The dry state of the fuel cell is estimated using various parameters since it is difficult to directly measure the dry state in the fuel cell. Based on the estimated dry state, the pressure target of the oxidant gas in the cathode is set. Here, the parameters used when the dry state of the fuel cell is estimated include the power generation current, the temperature, etc. of the fuel cell, which may oscillate according to operation conditions of the system (such as in an idle operation). Such oscillation of the parameters leads to the oscillation of the estimation result of the dry state and the oscillation of the pressure target controlled based on the estimation result as well.

A conventional pressure target is controlled along a given required pressure path. Such a path is set so that the fuel cell is as undry as possible even if the value of the power generation current of the fuel cell oscillates. The oscillation of the pressure target due to the oscillation of parameters such as the value of the power generation current may lead to the movement of the operating point of the compressor between the surge region and a non-surge region, and sharp oscillation of the pressure ratio and a flow rate request of the compressor. Then, operation sounds and vibrations may be generated from the compressor etc. It leads to the improvement in customer satisfaction to reduce such sounds and vibrations since these operation sounds and vibrations may feel uncomfortable for drivers. The movement of the operating point between the surge region and the non-surge region causes hunting of the compressor and valves, which may lead to progress in deterioration of components. Therefore, it also leads to the improvement in customer satisfaction to slow down such deterioration of components.

Thus, in the fuel cell system 100, the pressure target control part 52 is capable of executing at least rise control to raise the pressure target, and lower control to lower the pressure target, the rise control and the lower control are such that the operating point determined by the delivery flow rate and the pressure ratio of the compressor 21b is positioned outside the surge region, the current pressure target is corrected to the value same as the last pressure target if the current pressure target is lower than the last pressure target when the rise control is being carried out, and the current pressure target is corrected to the value same as the last pressure target if the current pressure target is higher than the last pressure target when the lower control is being carried out.

Here, "rise control such to raise the pressure target" means pressure control to raise the pressure target along a given required pressure rise path (rise path). Likewise, "lower control to lower the pressure target" means pressure control to lower the pressure target along a given required pressure lower path (lower path). The rise path and the lower path are set so that the operating point of the compressor 21b is positioned outside the surge region in view of suppressing the dryness of the fuel cell 10. The rise path and the lower path may be the same path, but are preferably different paths. This is because, as in FIGS. 2A and 2B described later, the dry state of the fuel cell 10 is different between the case where the rise control is carried out and the case where the lower control is carried out, and thus setting the paths in view of the foregoing makes it possible to suppress the dryness of the fuel cell 10. The operating point of the compressor easily moves between the surge region and the non-surge region since a conventional required pressure path is determined in view of suppressing the dryness of a fuel cell.

"Operating point" is a point on a two-dimensional graph which is determined by the delivery flow rate and the pressure ratio of the compressor 21b. "Delivery flow rate" is the delivery flow rate of the oxidant gas which is delivered from the compressor 21b and is measured by the delivery side air flow meter F2. For example, the delivery flow rate may be calculated by a known method as described in Patent Literature 1. "Pressure ratio" is the pressure ratio of the absorption side and the delivery side of the compressor 21b. Since the pressure on the absorption side is almost the same as atmospheric pressure, the result measured with the atmospheric pressure sensor P1 can be used as the pressure on the absorption side. The result measured with the delivery side pressure sensor P2 can be used as the pressure on the delivery side. "Surge region" is a predetermined region on a two-dimensional graph which is defined by the delivery flow rate and the pressure ratio. If the operating point is positioned in this region, the compressor 21b surges. A region where surging does not occur is referred to as the non-surge region.

Further, "the current pressure target is corrected to the value same as the last pressure target if the current pressure target is lower than the last pressure target when the rise control is being carried out" means to correct the current pressure target to the value same as the last pressure target if the current pressure target calculated by the pressure target control part 52 takes a smaller value than the last pressure target when the rise control is being carried out: that is, to maintain the last pressure target in such a case. Likewise, "the current pressure target is corrected to the value same as the last pressure target if the current pressure target is higher than the last pressure target when the lower control is being carried out" means to correct the current pressure target to the value same as the last pressure target if the current pressure target calculated by the pressure target control part 52 takes a larger value than the last pressure target when the lower control is being carried out: that is, to maintain the last pressure target in such a case.

Figure 2A:
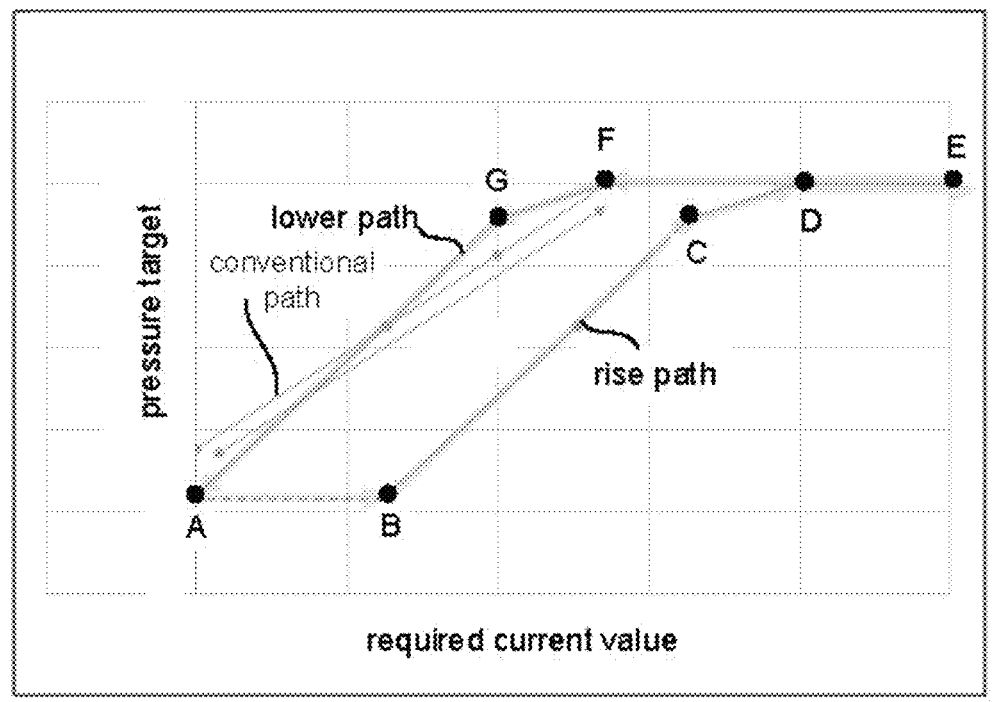
FIGS. 2A and 2B are graphs showing the relationship between required current values and pressure targets of fuel cells.
Figure 2B:
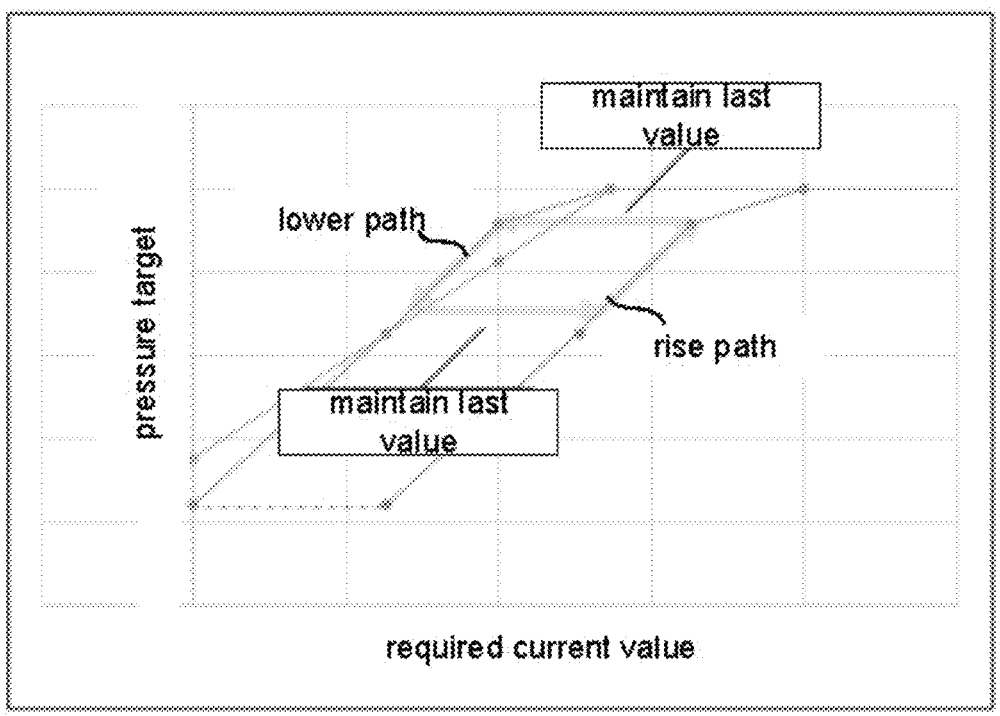

One example of the pressure control in the fuel cell system 100 will be described using FIGS. 2A and 2B. FIGS. 2A and 2B show the relationship between required current values and pressure targets of fuel cells: FIG. 2A explanatorily shows one example of a conventional required pressure path and required pressure paths for the fuel cell system 100; and FIG. 2B explanatorily shows paths when the required current values change in the middle of the paths;

As in FIG. 2A, conventional control of the pressure target is performed along one required pressure path. In contrast, the control of the pressure target in the fuel cell system 100 is performed along two different paths of the rise path (path linking each point A to E) and the lower path (path linking each point E to A). The paths are set so as to exhibit hysteresis in FIG. 2A. First, the rise path will be described. The rise path starts in a state where the temperature of the fuel cell is low, that is, the fuel cell is difficult to dry. Thus, the pressure target between the points A and B is offset since it is not necessary to raise the pressure target until the required current value is somewhat large. The pressure target starts to rise when the required current value of the fuel cell 10 is at the point B, slows down rising thereof when the required current value is between the points C and D in the last phase, and is fixed between the points D and E irrespective of the required current value. This is because too high a pressure target may lead to difficult control of suppression of the dryness of the fuel cell. Next, the lower path will be described. The lower path starts in a state where the temperature of the fuel cell is high, that is, the fuel cell is easy to dry. Thus, the dryness is controlled as the pressure target is fixed between the points E and F irrespective of the required current value, and the pressure target gradually starts to lower from the position corresponding to the point F to the point G. The pressure target between the points G and A, where the required current value (fuel cell temperature) somewhat lowers, is capable of lowering a little more sharply than that between the points F and G since the state between the points G and A is not that care must be taken over the dryness compared to the state between the points E to G. As described above, in FIG. 2A, two different paths of the rise path and the lower path are employed in view of the state of the fuel cell 10.

Here, the case where the required current values change will be described using FIG. 2B. The change in the required current value is followed by the change in the pressure target since to avoid the surge region is not taken into consideration in a conventional path; which may lead to the movement of the operating point of the compressor between the surge region and the non-surge region.

In contrast, in the fuel cell system 100, the rise path, which is set so that the surge region is avoided, is employed, which suppresses the movement of the operating point of the compressor 21b between the surge region and the non-surge region even if the current pressure target gets higher than the last pressure target during the rise control. If getting lower than the last pressure target, the current pressure target is corrected to the value same as the last pressure target, that is, the last pressure target is maintained, which also suppresses the movement of the operating point of the compressor 21b between the surge region and the non-surge region. Here, as in FIG. 2B, the last pressure target is preferably maintained until the required current value reaches the lower path from the rise path.

The same is applied to the case of the lower control. That is, the lower path, which is set so that the surge region is avoided, is employed, which suppresses the movement of the operating point of the compressor 21b between the surge region and the non-surge region even if the current pressure target gets lower than the last pressure target during the lower control. If getting higher than the last pressure target, the current pressure target is corrected to the value same as the last pressure target, that is, the last pressure target is maintained. This also suppresses the movement of the operating point of the compressor 21b between the surge region and the non-surge region. Here, as in FIG. 2B, the last pressure target is preferably maintained while the required current value reaches the rise path from the lower path.

As described above, the pressure target control part 52 of the fuel cell system 100 can execute at least the rise control and the lower control such that the operating point of the compressor is positioned outside the surge region, and maintains the last pressure target if the rising (lowering) of the pressure target changes to the lowering (rising) thereof during the control, which can suppress the movement of the operating point of the compressor between the surge region and the non-surge region. According to this, the frequencies when the pressure target changes during the pressure control go down, which can suppress operation sounds, vibrations and hunting from the compressor 21b etc. Further, the pressure target can be controlled to be fixed compared to the conventional, which can improve controllability to reduce the fuel consumption.

Figure 3A:
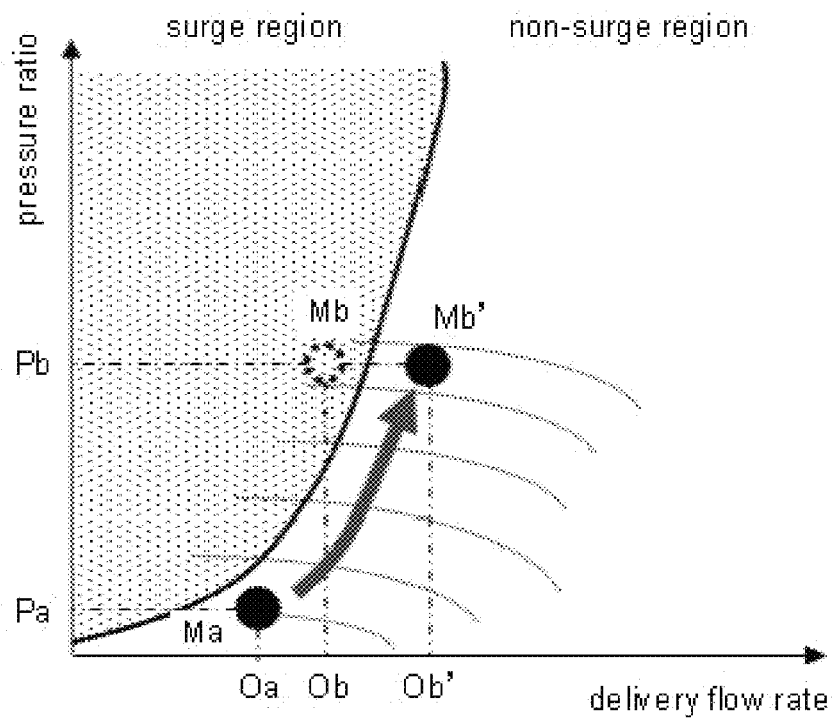
FIGS. 3A and 3B are graphs showing the relationship between delivery flow rates and pressure ratios of compressors in rise control.

The effect of suppressing the movement of the operating point of the compressor 21b between the surge region and the non-surge region will be further described using FIGS. 3A to 4B. FIGS. 3A and 3B show the relationship between delivery flow rates and pressure ratios of compressors in the rise control: FIG. 3A shows one example of the fluctuation of an operating point of a conventional compressor; and FIG. 3B shows one example of the fluctuation of the operating point of the compressor of the fuel cell system 100.

As in FIG. 3A, when the pressure ratio of a fuel cell is changed from Pa of a low dry protection request to Pb of a high dry protection request in conventional rise control, first, the delivery flow rate of a compressor is changed from Oa to Ob. That is, the operating point of the compressor is changed from point Ma to point Mb. Since the point Mb is in the surge region, the delivery flow rate is increased using the bypass flow path, and is changed to a delivery flow rate Ob' in order to move the operating point to the non-surge region. Then, as the pressure ratio Pb is kept, the operating point is moved to Mb' in the non-surge region. As described above, in a conventional control method, the operating point moves between the surge region and the non-surge region.

Figure 3B:
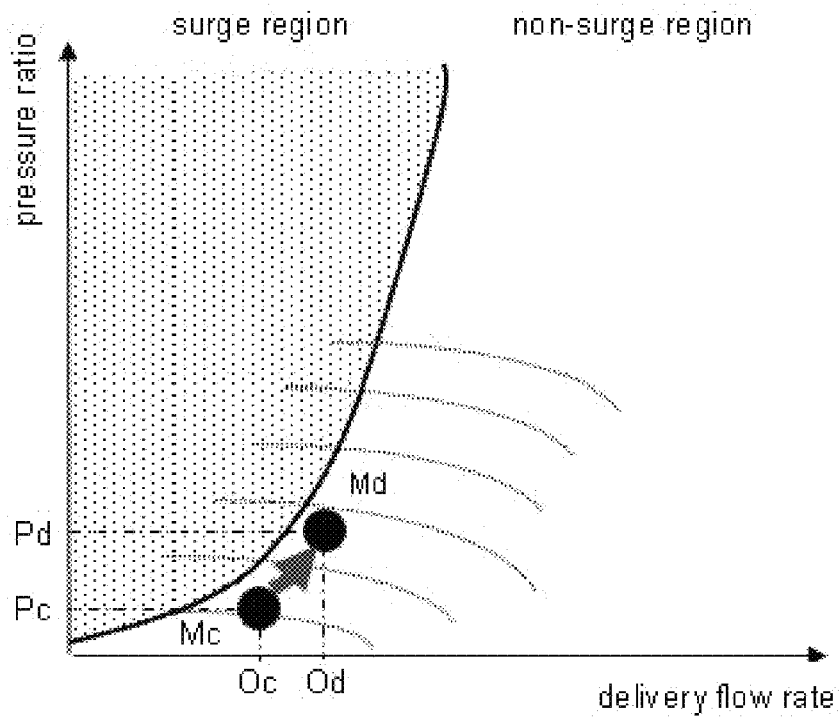

In contrast, as in FIG. 3B, in the rise control in the fuel cell system 100, the pressure ratio of the fuel cell 10 is changed from Pc of a low dry protection request to Pd of a moderate dry protection request because the rise path is set so that the operating point is positioned outside the surge region. Therefore, the delivery flow rate of the compressor 21b can be changed from Oc to Od without the use of the bypass flow path 23. That is, the operating point can be moved from point Mc to point Md while not being in the surge region. As described above, the rise control in the fuel cell system 100 can suppress the movement between the surge region and the non-surge region, which can suppress operation sounds etc. from the movement.

Next, the case of the lower control will be described. FIGS. 4A and 4B show the relationship between delivery flow rates and pressure ratios of compressors in the lower control: FIG. 4A shows one example of the fluctuation of an operating point of a conventional compressor; and FIG. 4B shows one example of the fluctuation of the operating point of the compressor of the fuel cell system 100.

As in FIG. 4A, when the pressure ratio of a fuel cell is changed from Pe of a high dry protection request to Pf of a low dry protection request in conventional lower control, first, the bypass flow path is stopped to be used since not being necessary to be used, and the delivery flow rate is decreased by the flow rate in the bypass and is changed from Oe to Oe'. That is, the operating point is moved from point Me to point Me' in the surge region. The delivery flow rate Oe' is then changed to a delivery flow rate Of that is according to required power generation, to move the operating point from the point Me' to point Mf.

In contrast, as in FIG. 4B, in the lower control in the fuel cell system 100, the pressure ratio of the fuel cell 10 is changed from Pg of a high dry protection request to Ph of a moderate dry protection request. Therefore, the delivery flow rate Og including the delivery flow rate in the bypass can be changed to the delivery flow rate Oh as the bypass flow path is continued to be used. That is, the operating point Mg can be moved to point Mh outside the surge region. When the bypass flow path is not used, the delivery flow rate Og' is changed to the delivery flow rate Oh', which leads to the movement of the operating point from point Mg' to point Mh' which are in the surge region. As described above, the lower control in the fuel cell system 100 can also suppress the movement between the surge region and the non-surge region, which can suppress operation sounds etc. from the movement.

Figure 5:
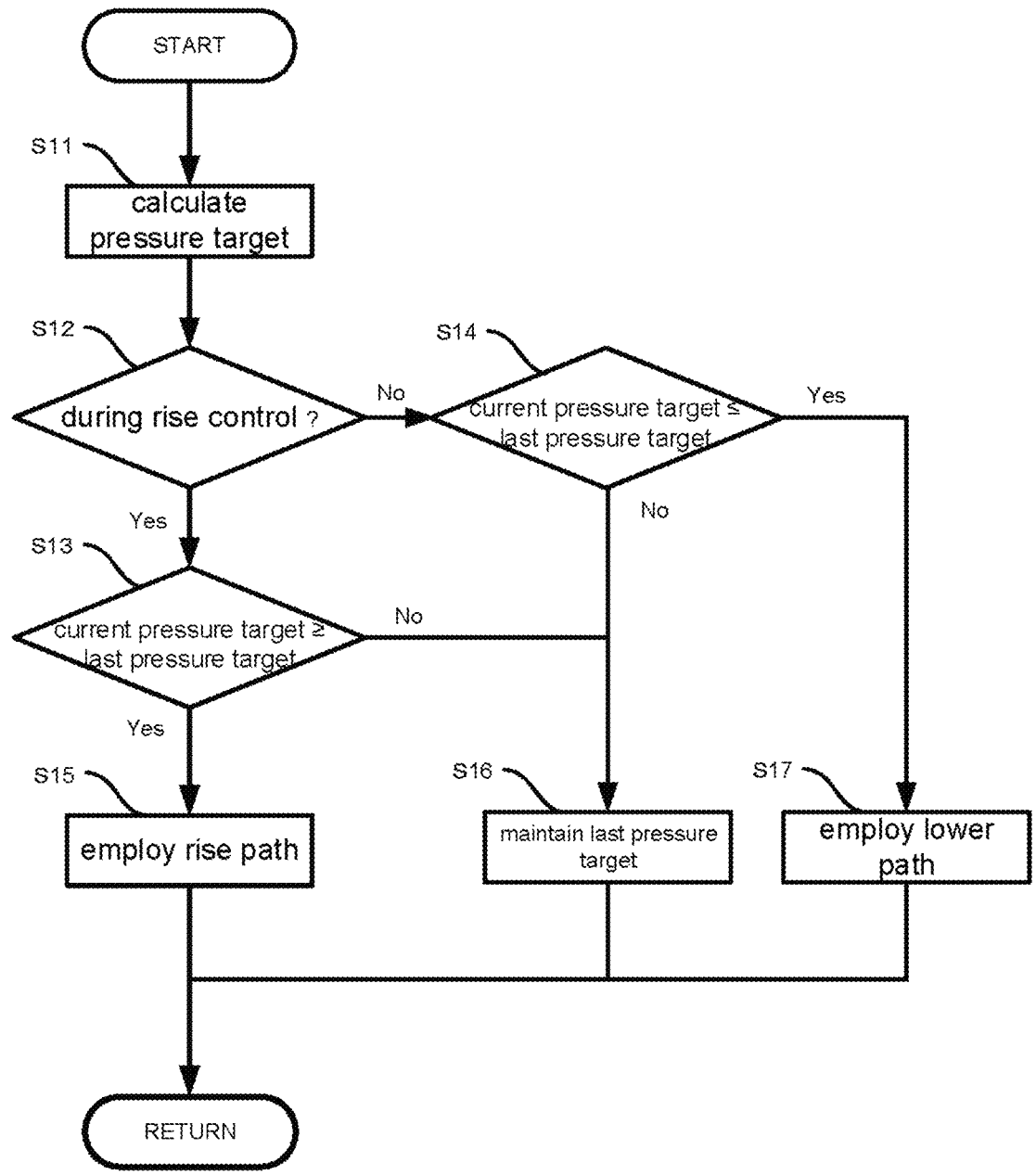
FIG. 5 shows one example of a flowchart of pressure control in the fuel cell system 100.

FIG. 5 shows one example of a flowchart of the pressure control in the fuel cell system 100. As in FIG. 5, the pressure control in the cell system 100 includes steps S11 to S17.

In the step S11, the current pressure target is calculated. The pressure target is calculated from a power generation required current value of the fuel cell etc. After the step S11 is completed, the step S12 is performed.

In the step S12, whether the current pressure control is the rise control or not is determined. If the rise control is being carried out, the step S13 is performed. If the rise control is not being carried out, that is, if the lower control is being carried out, the step S14 is performed.

In the step S13, it is determined whether the current pressure target is at least the last pressure target or not while the rise control is carried out. If the current pressure target is at least the last pressure target (current pressure target≥last pressure target), the step S15 is performed. If the current pressure target is lower than the last pressure target (current pressure target<last pressure target), the step S16 is performed.

In the step S14, it is determined whether the current pressure target is at most the last pressure target or not while the lower control is carried out. If the current pressure target is at most the last pressure target (current pressure target≤last pressure target), the step S17 is performed. If the current pressure target is higher than the last pressure target (current pressure target>last pressure target), the step S16 is performed.

The step S15 is carried out if the current pressure target≥the last pressure target when the rise control is being carried out in the step S13. The step S15 is for employing the current pressure target to raise the pressure along the rise path.

The step S16 is carried out if the current pressure target<the last pressure target when the rise control is being carried out in the step S13, or if the current pressure target>the last pressure target when the lower control is being carried out in the step S14. The step S16 is for correcting the current pressure target to the value same as the last pressure target and maintaining this last pressure target. The pressure target is preferably maintained until the required current value reaches the lower path from the rise path, or reaches the rise path from the lower path.

The step S17 is carried out if the current pressure target≤the last pressure target while the lower control is carried out in the step S14. The step S17 is for employing the current pressure target to lower the pressure along the lower path. After the steps S15 to 17 are completed, the step S11 is performed again.

Second Embodiment

Next, the second embodiment of the fuel cell system according to the present disclosure will be described. The second embodiment in the present disclosure is a fuel cell system comprising: a fuel cell; a compressor to supply an oxidant gas to the fuel cell based on a pressure target; a dry state estimation part to estimate a dry state of the fuel cell; a freeze protection control part to execute freeze protection control such that a temperature of the fuel cell is raised for suppressing a freeze of the fuel cell; and a dry protection control part to execute dry protection control such that dryness of the fuel cell is suppressed based on a result estimated in the dry state estimation part, wherein the dry protection control part controls the pressure ratio of the compressor so that an operating point determined by the delivery flow rate of the compressor and the pressure ratio is positioned outside a surge region when the freeze protection control and the dry protection control are executed at the same time.

Figure 6:
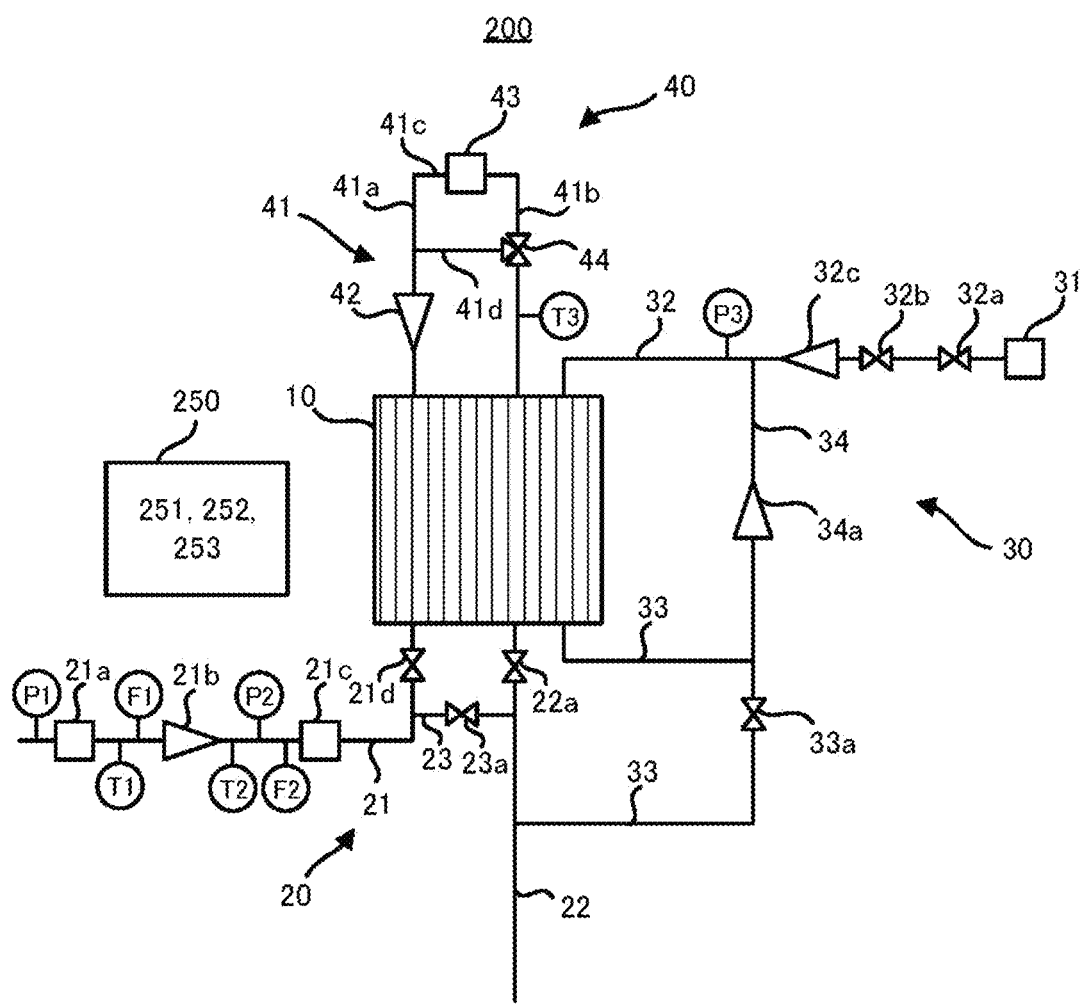
FIG. 6 is a block diagram of a fuel cell system 200.

Hereinafter description will be given using a fuel cell system 200 that is one example of the second embodiment. FIG. 6 shows a block diagram of the fuel cell system 200. The fuel cell system 200 is different from the fuel cell system 100 because having a control part 250 instead of the control part 50. The other structure of the fuel cell system 200 is the same as the fuel cell system 100.

<Control Part 250>

The control part 250 is to control the whole of the fuel cell system 200, and to control the oxidant gas supply and removal part 20, the fuel gas supply and removal part 30, the refrigerant circulation part 40, etc. in response to requests to make the fuel cell 10 generate electricity. For example, the control part 250 is a computer configured by CPU, ROM, RAM, etc. The control part 250 executes software corresponding to various kinds of control to control the whole of the fuel cell system 200.

Here, the control part 250 includes at least a dry state estimation part 251 to estimate a dry state of the fuel cell 10, a freeze protection control part 252 to execute freeze protection control such that the temperature of the fuel cell 10 is raised in order to suppress a freeze of the fuel cell 10, and a dry protection control part 253 to execute dry protection control such that dryness of the fuel cell 10 is suppressed based on the result estimated in the dry state estimation part 251.

The dry state estimation part 251 has the same structure as the dry state estimation part 51.

The freeze protection control part 252 is to execute freeze protection control such that the temperature of the fuel cell 10 is raised in order to suppress a freeze of the fuel cell 10. The freeze protection control part 252 controls the temperature of the fuel cell 10 so that the fuel cell 10 does not freeze, based on the outside temperature, the current temperature of the fuel cell 10, etc.

The dry protection control part 253 is to execute dry protection control such that the dryness of the fuel cell 10 is suppressed based on the result estimated in the dry state estimation part 251. The dry protection control part 253 controls the pressure ratio of the compressor 21b so that the fuel cell 10 does not dry, based on the temperature of the fuel cell 10 etc.

In a conventional fuel cell system, the freeze protection control and the dry protection control are separately carried out. During the freeze protection control, the freeze protection control has priority over the dry protection control. In the freeze protection control, the temperature of the fuel cell is raised to prevent the fuel cell from freezing. The temperature rise in the fuel cell is followed by the increase in the pressure ratio of the compressor for preventing dryness. Then, the operating point of the compressor moves between the surge region and the non-surge region, which may make the pressure ratio and a flow rate request of the sharply oscillate. This may cause operation sounds and vibrations from the air compressor which may feel uncomfortable for drivers. Therefore, it leads to the improvement in customer satisfaction to reduce such sounds and vibrations. In addition, the movement of the operating point of the compressor between the surge region and the non-surge region causes progress in deterioration of components due to hunting of the compressor and valve operation. Thus, it also leads to the improvement in customer satisfaction to slow down such deterioration of components. Such problems are frequently arisen especially in an idle operation.

In the fuel cell system 200, the dry protection control part 253 controls the pressure ratio of the compressor 21b so that the operating point determined by the delivery flow rate of the compressor 21b and the pressure ratio is positioned outside the surge region when the freeze protection control and the dry protection control are executed at the same time.

"When the freeze protection control and the dry protection control are executed at the same time" is a case where control including the freeze protection control and the dry protection control together is executed, specifically, the temperature and the pressure ratio of the fuel cell 10 are controlled so as to be capable of freeze protection and dry protection together. Further, the dry protection control part 253 controls the pressure ratio so that the operating point of the compressor is positioned outside the surge region. Here, the pressure ratio set when the freeze protection control and the dry protection control are executed at the same time is lower than that in a case where the freeze protection control and the dry protection control are separately executed as the conventional. The freeze protection control part 252 may control the temperature of the fuel cell 10 so that the operating point of the compressor is positioned outside the surge region.

Figure 7A:
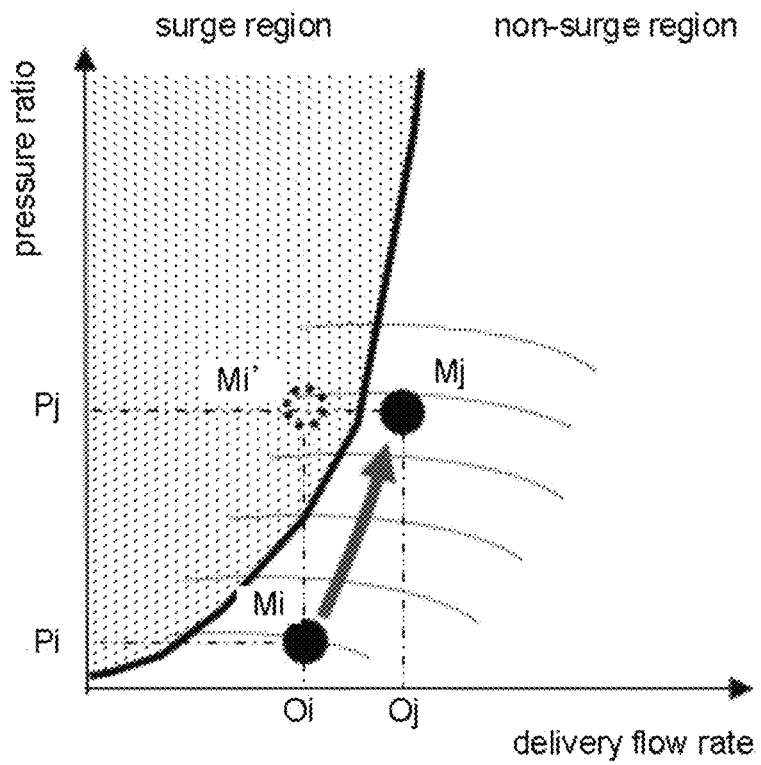
FIGS. 7A and 7B are graphs showing the relationship between delivery flow rates and pressure ratios of compressors when freeze protection control and dry protection control are executed.
Figure 7B:
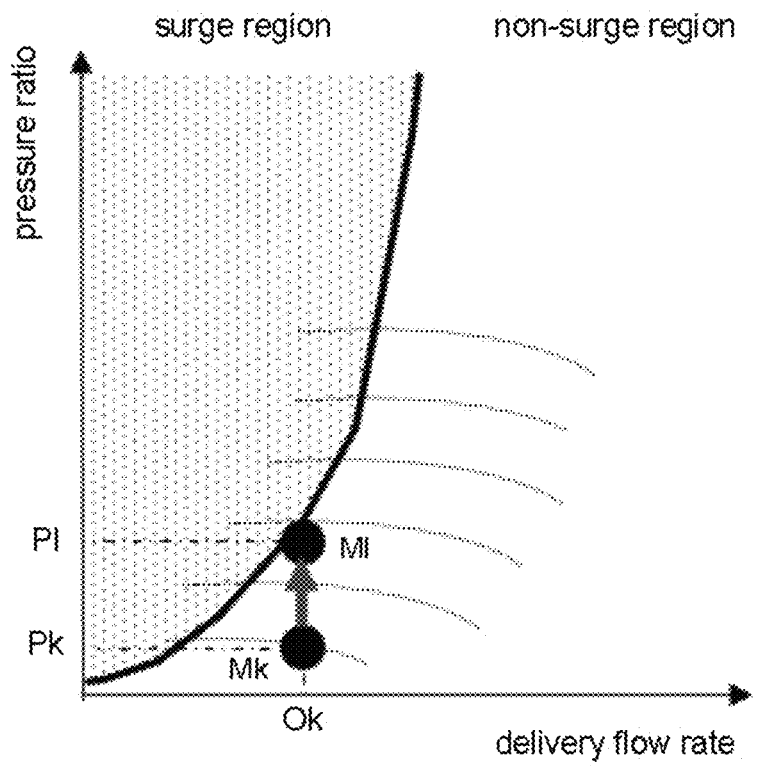

The difference between conventional control and the control in the fuel cell system 200 will be described using FIGS. 7A and 7B. FIGS. 7A and 7B show the relationship between delivery flow rates and pressure ratios of compressors when the freeze protection control and the dry protection control are executed: FIG. 7A shows one example of the fluctuation of an operating point of a conventional compressor; and FIG. 7B shows one example of the fluctuation of the operating point of the compressor of the fuel cell system 200.

In conventional control, since the freeze protection control priorly works, the temperature of the fuel cell 10 is raised first in order to prevent the freeze. The temperature rise in the fuel cell leads to the increase in the pressure ratio required for preventing the dryness. That is, as in FIG. 7A, the required pressure ratio is changed from Pi of a low dry protection request to Pj of a high dry protection request. In this case, when the operating point is moved from point Mi to point Mi' as the delivery flow rate Oi according to the required power generation of the fuel cell is maintained, the operating point is positioned in the surge region. Therefore, the delivery flow rate has to be increased to Oj using the bypass flow path 23 as the pressure ratio is maintained, in order to avoid the surge region. That is, it is necessary to move the operating point from the point Mi' to point Mj. As described above, in a conventional control method, the operating point moves between the surge region and the non-surge region.

In contrast, in the control in the fuel cell system 200, since the control including the freeze protection control and the dry protection control together is executed, the temperature and the pressure ratio of the fuel cell 10 capable of the freeze protection and the dry protection together are calculated first. Next, based on the calculated temperature, the temperature of the fuel cell 10 is raised. Then, as in FIG. 7B, the pressure ratio is changed from Pk of a low dry protection request to P1 of a moderate dry protection request. The operating point then moves from point Mk to point Ml as the delivery flow rate Ok according to the power generation of the fuel cell is maintained.

As described above, in the control in the fuel cell system 200, the control including the freeze protection control and the dry protection control together is executed, which can suppress the movement of the operating point of the compressor between the surge region and the non-surge region. This allows the frequencies when the pressure ratio largely changes during the control to go down, which can suppress operation sounds, vibrations and hunting from the compressor 21b etc. This can also reduce the fuel consumption.

Figure 8:
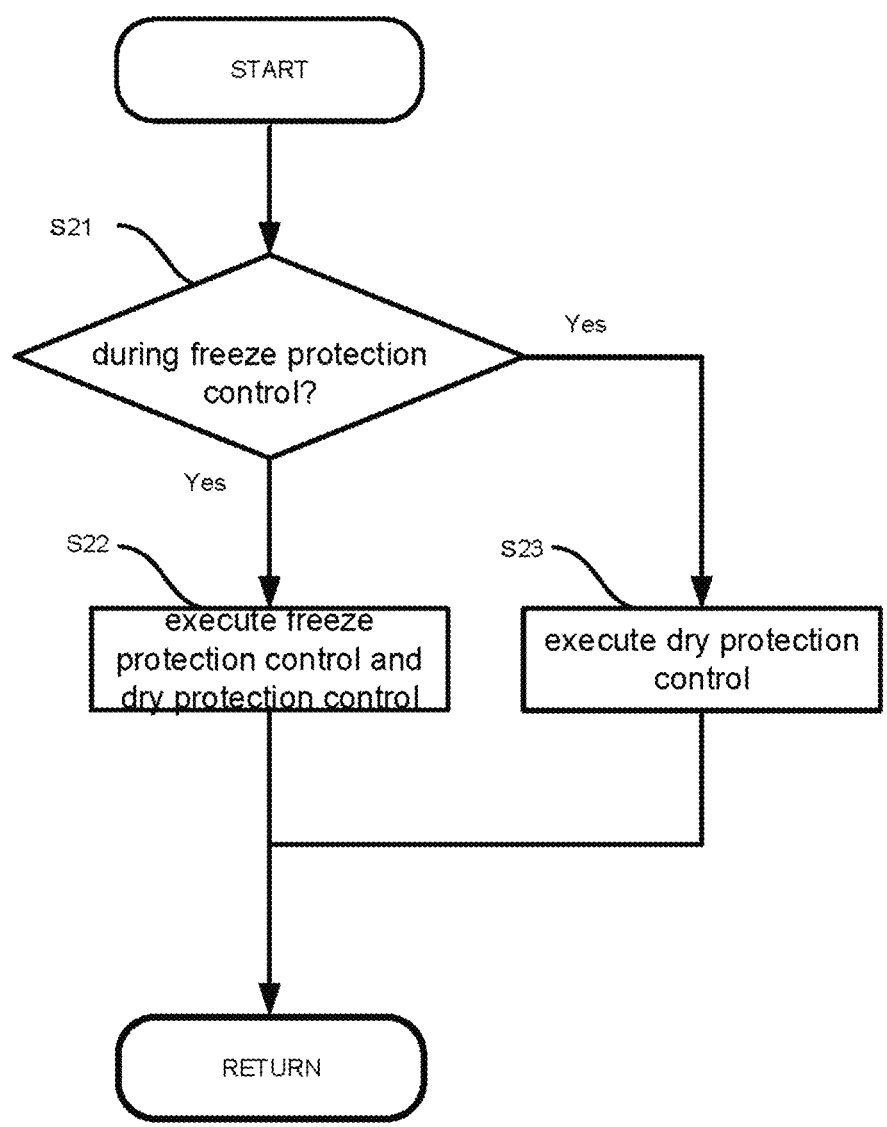
FIG. 8 shows one example of a flowchart of control in the fuel cell system 200.

FIG. 8 shows one example of a flowchart of the control in the fuel cell system 200. As in FIG. 8, the control in the fuel cell system 200 includes steps S21 to S23.

In the step S21, whether the freeze protection control is being carried out or not is determined. If the freeze protection control is being carried out, the step S22 is performed. If the freeze protection control is not being carried out, the step S23 is performed.

In the step S22, the control including the freeze protection control and the dry protection control together is executed. The control including the freeze protection control and the dry protection control together has been described above, and thus the description thereof is omitted here.

In the step S23, only the dry protection control is executed. That is, the dry protection control such that the dryness of the fuel cell 10 is suppressed based on the estimation result of the dry state is executed, and the pressure of the oxidant gas in the cathode is controlled so that the fuel cell 10 does not dry based on the temperature of the fuel cell 10 etc. After the steps S22 and S23 are completed, S21 is performed again.

Third Embodiment

The third embodiment of the fuel cell system according to the present disclosure is the combination of the first and second embodiments. Since the first and second embodiments have been described above, the description of the third embodiment, which is the combination thereof, is omitted.

INDUSTRIAL APPLICABILITY

The fuel cell system according to the present disclosure has been described above. Since the fuel cell system according to the present disclosure is capable of suppressing the movement of the operating point of the compressor between the surge region and the non-surge region compared to control in a conventional fuel cell system, operation sounds, vibrations etc. from the movement of the operating point between the surge region and the non-surge region can be suppressed. Thus, the fuel cell system according to the present disclosure can be said to be an extremely excellent technique in the field of the fuel cell vehicle.

REFERENCE SIGNS LIST 100 fuel cell system
10 fuel cell
20 oxidant gas supply and removal part
21 oxidant gas supply flow path
21a air cleaner
21b compressor
21c intercooler
21d inlet valve
22 oxidant gas removal flow path
22a regulating valve
23 bypass flow path
23a flow divider valve
30 fuel gas supply and removal part
31 fuel gas supply source
32 fuel gas supply flow path
32a on-off valve
32b pressure reducing valve
32c injector
33 fuel gas removal flow path
33a air removal valve
34 circulation flow path
34a circulating pump
40 refrigerant circulation part
41 refrigerant circulation flow path
41a refrigerant supply flow path
41b refrigerant removal flow path
41c radiator flow path
41d refrigerant bypass flow path
42 water pump
43 radiator
44 three-way valve
50 control part
51 dry state estimation part
52 pressure target control part
200 fuel cell system
250 control part
251 dry state estimation part
252 freeze protection control part
253 dry protection control part
P1 atmospheric pressure sensor
P2 delivery side pressure sensor
P3 fuel gas pressure sensor
T1 outside temperature sensor
T2 supply gas temperature sensor
T3 refrigerant temperature sensor
F1 absorption side air flow meter
F2 delivery side air flow meter

What is claimed is:
1. A fuel cell system comprising:
a fuel cell;
a compressor to supply an oxidant gas to the fuel cell based on a pressure target;
a dry state estimation part to estimate a dry state of the fuel cell; and
a pressure target control part to control the pressure target of the oxidant gas according to a result estimated in the dry state estimation part,
wherein the pressure target control part is capable of executing at least rise control to raise the pressure target, and lower control to lower the pressure target, the rise control and the lower control are such that an operating point determined by a delivery flow rate and a pressure ratio of the compressor is positioned outside a surge region, a current pressure target is corrected to a value same as a last pressure target if the current pressure target is lower than the last pressure target when the rise control is being carried out, and the current pressure target is corrected to the value same as the last pressure target if the current pressure target is higher than the last pressure target when the lower control is being carried out.

2. A fuel cell system comprising:

a fuel cell;

a compressor to supply an oxidant gas to the fuel cell based on a pressure target;

a dry state estimation part to estimate a dry state of the fuel cell;

a freeze protection control part to execute freeze protection control such that a temperature of the fuel cell is raised for suppressing a freeze of the fuel cell; and a dry protection control part to execute dry protection control such that dryness of the fuel cell is suppressed based on a result estimated in the dry state estimation part, wherein the dry protection control part controls a pressure ratio of the compressor so that an operating point determined by a delivery flow rate of the compressor and the pressure ratio is positioned outside a surge region when the freeze protection control and the dry protection control are executed at the same time.

3. The fuel cell system according to claim 1, wherein the compressor is a turbo compressor.

4. The fuel cell system according to claim 2, wherein the compressor is a turbo compressor.

5. The fuel cell system according to claim 1, wherein the rise control to raise the pressure target means pressure control to raise the pressure target along a rise path, the lower control to lower the pressure target means pressure control to lower the pressure target along a lower path, and the rise path and the lower path are different paths.

6. The fuel cell system according to claim 1, wherein the current pressure target is corrected to a value same as a last pressure target if the current pressure target is lower than the last pressure target when the rise control is being carried out, to maintain the last pressure target until a required current value reaches the lower path from the rise path, and the current pressure target is corrected to the value same as the last pressure target if the current pressure target is higher than the last pressure target when the lower control is being carried out, to maintain the last pressure target until a required current value reaches the rise path from the lower path.

* * * * *